United States Patent Office 2,953,525
Patented Sept. 20, 1960

2,953,525
OIL BASE DRILLING FLUID

Charles William Young, Anaheim, Calif., assignor to Shell Oil Company, New York, N.Y., a corporation of Delaware No Drawing. Filed Feb. 29, 1956, Ser. No. 568,448

7 Claims. (Cl. 252—8.5)

This invention relates to the drilling of oil and gas wells and pertains more particularly to the use and composition of an improved oil base drilling fluid.

Drilling fluids or muds are generally used when drilling wells by the rotary method. These muds are usually pumped down through the drill stem of the rotary rig and around the drill bit, returning to the surface through the annular passage between the drill stem and the well casing or borehole.

Prime requisites of a satisfactory drilling fluid are a sufficient gel structure to prevent undue settling of weighting material, and good plastering or sheath-forming characteristics. That is, the fluid must form on the walls of the borehole a mud sheath effectively preventing any appreciable fluid loss to the formation. Any substantial loss of fluid to the formation is undesirable at any time during the drilling, being especially dangerous and objectionable when drilling through heaving formations such as shale, or when drilling into the production zone, which may be contaminated and plugged by said fluid.

A further desirable characteristic of a drilling fluid is stability against contamination with salt solutions, such, for example, as brines entering the well. Since high borehole temperatures are often encountered in well drilling, it is also desirable that there be no breakdown of the drilling fluid when subjected to elevated temperatures and/or when contaminated with salts such as calcium sulfate. Additionally, since large quantities of cement are normally used in and around a well during drilling operations, a satisfactory oil base drilling fluid should be stable against contamination with cement in either its solidified form or the form of a wet slurry.

In order for a satisfactory oil base fluid to have good plastering properties, it has been necessary heretofore to add a plastering agent to the fluid. Various plastering agents such as clay, spent refinery clay, asphalt, blown asphalt, polymerized asphalt, etc., have been added to oil base fluids and these materials serve to coat or plaster the walls of the borehole with an impermeable sheath which prevents the escape of the drilling fluid into the formations traversed by the borehole. In general, it is necessary to add dispersing agents which serve to maintain the solid components of the drilling fluid uniformly dispersed. The cheapest and most commonly used plastering agent in oil base drilling muds is some form of a soft asphalt such as blown asphalt. However, certain difficulties are encountered in handling blown asphalt, as it is oftentimes necessary to heat the material at the wellhead before admixing it with the rest of the drilling fluid.

It is therefore a primary object of the present invention to provide a drilling fluid possessing excellent plastering properties which does not incorporate the commonly known plastering agents such as clays and specially-treated asphalts.

Another object of this invention is to provide an oil base drilling fluid which is neither impaired by high temperatures nor affected by cement or brine contamination to the same extent as ordinary drilling fluids of the same types.

Since oil base muds are relatively expensive, costing several times as much as the water base mud, and since approximately 200 barrels of oil base mud are lost while drilling through an average producing zone, it is another object of this invention to provide an oil base drilling fluid having satisfactory plastering properties even when made with the cheapest of oils, such as a crude oil, or any of several residual asphaltic oils.

A further object of the present invention is to provide an oil base drilling fluid which is able to withstand contamination with 20% or more by volume of water without any detrimental effects.

Other objects of this invention will be understood from the following description of the invention.

The term oil base fluid or mud as employed herein and in the appended claims is used to describe an oil base fluid having a liquid base consisting substantially of an oil, although it may be noted that these so-called pure oil base drilling fluids may at times contain a small amount of emulsified or non-emulsified water, usually formation water, rain water, water from aqueous soap additives, etc., equal to from one to several percent of the total fluid phase.

The present invention can be practiced by adding to an asphaltic crude oil or to a residual asphaltic oil a small quantity of sulfuric acid which is subsequently neutralized with lime in the form of calcium oxide or calcium hydroxide. A small amount of water is also preferably added to further the neutralizing reaction between the lime and the sulfuric acid. The additions of first sulfuric acid and subsequently lime to an asphaltic crude or residual oil yields an oil base fluid that forms a thin impervious mud sheath on the borehole walls. The above oil base fluids possess excellent plastering properties.

Example I

A fuel oil was treated with concentrated sulfuric acid by mixing 350 cc. of residual fuel oil with 2 cc. of concentrated sulfuric acid and stirring for five minutes. This mixture was then treated with 8 cc. of water and 10 grams of calcium oxide and the resultant mixture was stirred until the acid had been neutralized. The plastering properties as indicated by the filter loss figure was 0.2 cc. per cm.$^2$ per hour at 275° F. and 500 p.s.i. In addition the gel strength at 0 and 10 minutes was 2 pounds per 100 sq. ft. at 105° F. The plastic viscosity of the mud was 105 cp. at 105° F. and the Bingham yield value was 11 pounds per 100 sq. ft. at 105° F.

This mud was found to be satisfactory for unweighted muds. If weighting materials are to be added to make a heavier mud, a gelling agent is preferably added to improve the suspending properties of the mud. Gelling agents used in oil base muds usually consist of soaps or salts of well known materials such as fatty acids, rosin acids or rosin residue acids.

Since the above-described oil base mud already contained an excess of lime, it was only necessary to add an acid to react with the lime to form a soap of the calcium-type.

Example II

An oil base drilling mud prepared from 350 cc. of fuel oil, 2 cc. of concentrated sulfuric acid, 8 cc. of water, 15 grams of calcium oxide and 3 grams of stearic acid had the following properties: filtrate loss 0.17 cc. per cm.$^2$ per hour at 275° F. and 500 p.s.i., gel strength at 0 and 10 minutes, each 3 pounds per 100 ft.$^2$ at 105° F., Biingham yield value 26 pounds per 100 ft.$^2$ at 105° F., plastic viscosity 121 cp. at 105° F. The measured plastic viscosity of a mud is the same as its differential viscosity. In all of the examples the plastic viscosity and the Bingham yield value were measured on a Fann viscometer (Geophysical Machine Works, Houston). The drilling mud of Example II, when weighted with barites to 80 pounds per cubic foot showed no tendency at settling at temperatures up to 130° F. and only normal settling 130 to 300° F.

In the event that an oil base mud with a lower viscosity is desired, a lower viscosity oil such as a distillate oil, for example, stove oil, may be added in suitable quantity to reduce the viscosity to the desired value.

*Example III*

A drilling mud comprising 330 grams of residual fuel oil, 2 cc. concentrated sulfuric acid, 8 cc. of water and 15 grams of quick lime and 1.5 g. stearic acid was diluted with varying amounts of stove oil. The viscosities of the various muds were measured at 105° F. and the results were as follows:

| Percent Stove Oil | Plastic Viscosity, cp. | Yield Value lbs./100 ft.$^2$ | Gel Strength 0–10 min.; lbs./100 ft.$^2$ |
|---|---|---|---|
| 0 | 121 | 26 | 3–3 |
| 10 | 70 | 28 | |
| 13 | 64 | 27 | |
| 15 | 51 | 25 | 2–3 |

The filter loss of a sample containing 15% stove oil was found to be 0.19 cc./cm.$^2$/hr. at 275° F. and 500 p.s.i.

*Example IV*

Another mud was prepared as in Example III, except that 24% stove oil was added thereto. This mud was weighted to 92 lbs./cu. ft. with barites and had the following properties:

| Filtrate Loss | Gel Strength | Bingham Yield Value | Plastic Viscosity |
|---|---|---|---|
| 0.05 cc./cm.$^2$/hr. at 180° F. and 500 psi. | 0–10 min. 15–19 lbs./100 ft.$^2$ at 84° F. | 55 lbs./100 ft.$^2$ at 84° F. | 111 cp. at 84° F. |

These tests indicate this mud to be extremely satisfactory for use in field operations.

*Example V*

An oil base drilling fluid prepared from 350 cc. of South Mountain crude oil, 2 cc. concentrated sulfuric acid, 8 cc. water and 15 grams calcium oxide had the following properties: filtrate loss 0.10 cc./cm.$^2$/5 hr. at 500 p.s.i. and 275° F., gel strength 0 and 10 min.: 2 and 3 lbs./100 ft.$^2$ at 100° F., and plastic viscosity 127 cp. at 105° F.

Prior to using the oil base muds of Examples I to V in the field, they were tested in the laboratory with respect to various conditions which might be encountered in the field.

When a mud made in accordance with the formula of Example I was tested with regard to water contamination, it was found to be stable to water in amounts up to 15% by volume for muds weighing 90 lbs./cu. ft. Another oil base mud made with a different residual base oil and weighted to 100 lbs. per cu. ft. with barites was less stable with some of the barites becoming water-wet and separating out when 10% water by volume was added to the mud. By the addition to this mud of 6 lbs./barrel of rosin size, the mud was made capable of withstanding a 20% by volume water contamination without detrimental effects to the mud. The rosin size in this case acted as an emulsifying agent. Suitable agents for this purpose are the soaps of rosin, resin residues, naphthenic acids, etc. A product such as B-grade rosin is entirely satisfactory for this purpose and is quite inexpensive. Due to the excess of calcium in the mud, a calcium soap of the rosin is formed. It is realized that the alkali metal soaps of these resins may be added to the mud if desired, however, the presence of excess calcium in the mud readily converts them to the calcium soaps.

When the present muds were tested with regard to salt contamination, they were found to be stable to contamination with 20% by volume of a 2 percent brine. The muds were also found to be stable to gypsum contamination. No effect could be noted from the addition of 10 lbs. of gypsum per barrel to a 100 lbs./cu. ft. mud. In addition, there was no increase in the filter loss of the present muds when as much as ten pounds per barrel of a ground set cement or 20 pounds of a wet cement slurry were added to the muds.

The present oil base muds were also tested with regard to contamination with a water base mud. The addition of 20% by volume of an 80 lb./cu. ft. water base mud showed no adverse effect other than a normal increase in viscosity. In addition, the present muds were not adversely effected by the addition of 50 lbs./barrel of ground shale.

The first field test of the present oil base mud was made on a California well A which was initially drilled with a water base mud to a depth of 4795 feet. A 4¾″ hole was drilled from the shoe of the liner at 4795 feet to a total depth of 5840 feet and the well was subsequently plugged back to 5145 feet. At 4795 feet the water base mud system was changed over to an oil base mud system in accordance with the present invention. During the next twelve days, 1045 feet of formation were drilled using the oil base mud; 347 feet of cement were drilled out; the 4¾″ hole was under-reamed to 5″; two induction logs were run; a drill stem test was made and the original 5¾″ liner was washed. The present oil base mud behaved very satisfactorily in all of these operations and the mud weight only increased 1 lb./cu. ft. during this time indicating that almost all of the drilled solids settled out in the surface settling system.

A Marsh funnel viscosity of approximately 125 seconds was found to be more desirable from a drilling point of view than the 60–80 seconds previously used. At this well no settled cuttings or fill was encountered after any round trip during which a bit was changed, whereas 4 to 8 ft. of fill were usually found after a trip in adjacent holes where other oil base muds have been employed. A saving in rig time of approximately 9 hours was realized at this well by being able to go back to the bottom of the well each time rather than feeling for the fill and then circulating the fill out of the hole prior to running the logs and the liner. This action is attributable to the better suspending properties of the present oil base mud.

The volume of mud in the system varied from 390 to 551 barrels. The loss of mud to the formation and around the drill rig due to spills or drainage from pipes averaged slightly less than 10 barrels per day which is considered to be very good. Mud samples were taken out of the flow line while drilling 4 hours after each round trip and the water content, plastic viscosity, Bingham yield value, gel strength and filter loss were determined in the laboratory. During the twelve day period, the mud weight varied from 60 to 62 lbs./cu. ft., the Marsh funnel viscosity 120 to 140 seconds, the plastic viscosity 50–60 cp., and the filter loss 0.12 to 0.18 cc./cm.$^2$/.5 hr. at 500 p.s.i., and 275° F. In this first test, an unweighted mud was used.

The same mud was used in the second well B in the same California field along essentially the same lines as previously discussed with regard to well A. A 4¾″ hole was drilled from the shoe of the liner at 6070 ft. to a total depth of 6645 ft. and plugged back to 6280 ft. During a ten-day period, 375 ft. of formation was drilled; a cement plug was partially cleaned out; the 4¾″ hole was under-reamed to 5″; an induction log was run; two formation tests were made; the original 5¾″ liner was washed; and a 3½″ liner was run into the open hole. The present oil base mud behaved very satisfactorily in all of these operations. The only mud treatment necessary was the addition of 6 barrels of stove oil to reduce the viscosity from 150 seconds to 125 seconds. The total mud loss during the total ten-day period was 100 barrels. The mud system averaged 500 barrels.

In another California well C, an oil base mud was made in accordance with the present invention and weighted to 73 lbs./cu. ft. with barites, no settling being observed. The mud was used in well C while perforating the two producing intervals 8090–8100 and 9771–9847 ft. and washing the perforations. The mud was used in the well for approximately 2½ days and had the following properties: weight 73–74 lbs./cu. ft.; viscosity Marsh funnel 125–135 seconds at 100° F.; daytime temperature 105–115 seconds at 125° F. flow line temperature; plastic viscosity 110 cp. at 105° F.; Bingham yield value 22 lbs./100 sq. ft. at 105° F.; gel strength (0–10 minutes) 3–4 at 305° F.; filter loss 0.1 cc./cm.$^2$/.5 hr. at 275° F. and 500 p.s.i.; 0.04 cc./cm.$^2$/.5 hr. at 180° F. and 500 p.s.i.

A fourth well D was reconditioned in the Ventura field with a mud of the present invention weighted to 80 lbs./cu. ft. Its performance was satisfactory during such operations as drilling out sand and asphaltene deposits, washing the liner and running an inner liner. Subsequently, the mud weight was increased by the addition of barites to 85 lbs./cu. ft. to overcome gas cutting. For a time, a portion of the mud system had a high viscosity due to gas cutting and contamination by 15.9% water. The addition of small amounts of stove oil quickly reduced the viscosity to normal. The average mud properties were as follows: mud weight 80–85 lbs.//cu.ft.; Marsh funnel viscosity 115–160 seconds; plastic viscosity 86–120 cp.; yield value 37–45 lbs./100 sq. ft.; gel strength (0–10 minutes) 4–8 and 6–13; filter loss 0.13 cc./cm.$^2$/.5 hr. at 275° F. and 500 p.s.i.; water content 8.1%.

The basic ingredients for an oil base mud in accordance with the present invention are an asphaltic residual oil such as fuel oil or any of several asphaltic crude oils such as Santa Maria or South Mountain crude, a small amount of sulfuric acid and sufficient lime to neutralize the acid. Stove oil or other lighter distillate oils such as kerosene or diesel oil may be added up to 30% by volume to help reduce the viscosity of the mud when the mud becomes contaminated with formation waters or other materials. Normally, considerable decrease in viscosity will be experienced by the addition of from 1 to 5% of a light distillate oil.

The amount of sulfuric acid incorporated in the present oil base mud varies from 0.1 to 5% or more by weight, it being the general practice to incorporate the minimum amount necessary to reduce the cost of the mud. The amount of sulfuric acid to be used depends entirely upon the type of residual or crude oil being employed in the mud. For most of the muds used in the field trials about 1% by weight or about 0.5% by volume of sulfuric acid was used in the mud.

Sufficient lime is added to neutralize the acid subsequent to admixing the acid thoroughly with the oil. Preferably a small amount of excess lime is present in the mud thus being available to convert any organic acid to the calcium soap in the event that the gelling agent is required in the mud to meet the specialized drilling conditions. A small amount of water is preferably added prior to the addition of lime. Normally the lime added will amount to from 1 to 6% or higher by weight of the mud.

When higher gel strengths are needed in the heavier muds made in accordance with the present invention in order to support the weighting materials contained therein, gelling agents in the form of organic soaps may be formed readily by admixing with the mud from 0.2 to 1.5% or higher by weight of an acid such, for example, as stearic acid, rosin acid, or rosin residue acid. It is realized that the gelling agent may also be in the form of any combination of fatty acids or fatty acids and resin acids.

As stated above, oil base drilling fluids of the present invention may be contaminated with up to 10% or more by volume of water and still remain satisfactory. However, if desired this water may be emulsified more tightly in the drilling mud by adding any suitable well-known emulsifying agent to the mud, such for example, as B grade rosin size. The addition of from 0.5 to 5% or more of an emulsifier is sufficient to emulsify up to 20% or more water in the oil base mud. Any of the muds may be weighted with suitable weighting materials well known to the art, such, for example, as barite, finely divided calcium carbonate, ground up oyster shells, heavy ores and the like. The weighting materials may be made oil-wettable as by coating them with a carbonaceous substance prior to admixing them into the mud.

The base oil to be used in the present oil base drilling muds may be described as an asphaltic mineral oil containing a substantial proportion of thermally-unstable substantially-non-distillable components such as asphaltenes and maltenes, said asphaltenes and maltenes being present as a combined portion equal to at least about 5% of the oil.

I claim as my invention:

1. An oil-based mud comprising a predominant quantity of an asphaltic mineral oil containing asphaltenes and maltenes having a combined weight of at least 5%, the reaction products formed by the addition of from 0.1 to about 5% by weight of sulfuric acid to said oil, and the reaction products formed by the addition of lime sufficient in quantity to neutralize said acid-treated oil, said reaction products being capable of forming a substantially fluid-impervious filter cake on the wall of the well.

2. An oil base mud substantially free of water comprising a predominant quantity of as asphaltic residual fuel oil containing asphaltenes and maltenes having a combined weight of at least about 5%, the reaction products formed by the addition of from 0.1 to about 5% by weight of sulfuric acid to said oil, the reaction products formed by the addition of from 0.5 to about 6% of lime to said acid treated oil, said reaction products being capable of forming a substantially fluid impervious filter cake on the wall of the well, a quantity of water sufficient to react with said lime, and from 0.2 to about 1.5% of a gelling agent being selected from the group consisting of soaps of fatty acids, rosin acids, and rosin residue acids.

3. An oil base mud substantially free of water comprising a predominant quantity of an asphaltic crude oil containing asphaltenes and maltenes having a combined weight of at least about 5%, the reaction products formed by the addition of from 0.1 to about 5% by weight of sulfuric acid to said oil, the reaction products formed by the addition of from 0.5 to about 6% of lime to said acid treated oil, said reaction products being capable of forming a substantially fluid impervious filter cake on the wall of the well, a quantity of water sufficient to react with said lime, and from 0.2 to about 1.5% of a gelling agent being selected from the group consisting of soaps of fatty acids, rosin acids and rosin residue acids.

4. In a process for drilling a well with well drilling tools wherein there is circulated in the well an asphaltic oil base drilling mud containing asphaltenes and maltenes having a combined weight of at least about 5%, and containing weighting materials, the method of forming a filter cake on the wall of said well to decrease the loss of fluid from said drilling mud contained therein into the surrounding earthen formations which comprises admixing with said drilling mud and interacting therewith a small amount of sulfuric acid, subsequently admixing and interacting with said acidified drilling mud a quantity of an alkaline-earth metal base sufficient to neutralize said acid, and contacting the wall of said well with the resulting drilling mud to form a filter cake thereon, said mud containing the reaction products formed during said neutralization.

5. In a process for drilling a well with well drilling tools wherein there is circulated in the well an asphaltic oil base drilling mud containing asphaltenes and maltenes having a combined weight of at least about 5%, and containing weighting materials, the method of forming a filter cake on the wall of said well to decrease the loss of fluid from said drilling mud contained therein into the surrounding earthen formations which comprises admixing with said drilling mud and interacting therewith from 0.1 to about 5% by weight of sulfuric acid, subsequently admixing and interacting with said acidified drilling mud a quantity of an alkaline-earth metal base selected from the class consisting of calcium oxide and calcium hydroxide in an amount sufficient to neutralize said acid, and contacting the wall of said well with the resulting drilling mud to form a filter cake thereon, said mud containing the reaction products formed during said neutralization.

6. In a process for drilling a well with well drilling tools wherein there is circulated in the well an asphaltic residual oil base drilling mud containing asphaltenes and maltenes having a combined weight of at least about 5%, and containing weighting materials, the method of forming a filter cake on the wall of said well to decrease the loss of fluid from said drilling mud contained therein into the surrounding earthen formations which comprises admixing with said drilling mud and interacting therewith from 0.1 to about 5% by weight of sulfuric acid, subsequently admixing and interacting with said acidified drilling mud a quantity of lime sufficient to neutralize said acid, a quantity of water sufficient to react with any excess of said lime, and contacting the wall of said well with the resultant drilling mud to form a filter cake thereon, said mud containing the reaction products formed during said neutralization.

7. In a process for drilling a well with well drilling tools wherein there is circulated in the well an asphaltic crude oil base drilling mud containing asphaltenes and maltenes having a combined weight of at least about 5%, and containing weighting materials, the method of forming a filter cake on the wall of said well to decrease the loss of fluid from said drilling mud contained therein into the surrounding earthen formations which comprises admixing with said drilling mud and interacting therewith from 0.1 to about 5% by weight of sulfuric acid, subsequently admixing and interacting with said acidified drilling mud a quantity of lime sufficient to neutralize said acid, a quantity of water sufficient to react with any excess of said lime, from 0.2 to 1.5% by weight of a gelling agent, and contacting the wall of said well with the resulting drilling mud to form a filter cake thereon, said mud containing the reaction products formed during said neutralization.

References Cited in the file of this patent

UNITED STATES PATENTS

| | | |
|---|---|---|
| 2,099,825 | Rolshausen et al. | Nov. 23, 1937 |
| 2,151,029 | Vander Henst | Mar. 21, 1939 |
| 2,216,955 | Moore | Oct. 8, 1940 |
| 2,360,992 | Weiss | Oct. 24, 1944 |
| 2,361,476 | Higbee et al. | Oct. 31, 1944 |
| 2,402,325 | Griesinger et al. | June 18, 1946 |
| 2,599,683 | Abrams et al. | June 10, 1952 |
| 2,599,752 | Fischer | June 19, 1952 |
| 2,702,787 | Freeland | Feb. 22, 1955 |
| 2,798,851 | Nelson et al. | July 9, 1957 |